(12) United States Patent
Fukunaga et al.

(10) Patent No.: US 8,988,547 B2
(45) Date of Patent: Mar. 24, 2015

(54) IMAGE SIGNAL CORRECTING DEVICE, IMAGING DEVICE, IMAGE SIGNAL CORRECTING METHOD, AND PROGRAM

(71) Applicant: Sony Corporation, Tokyo (JP)

(72) Inventors: Masatsugu Fukunaga, Kanagawa (JP); Natsuko Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/500,140

(22) Filed: Sep. 29, 2014

(65) Prior Publication Data

US 2015/0015748 A1    Jan. 15, 2015

Related U.S. Application Data

(63) Continuation of application No. 12/737,117, filed as application No. PCT/JP2009/061640 on Jun. 25, 2009, now Pat. No. 8,860,853.

(30) Foreign Application Priority Data

Jun. 30, 2008    (JP) ................................. 2008-171760

(51) Int. Cl.
*H04N 5/235* (2006.01)
*H04N 5/76* (2006.01)
*H04N 9/64* (2006.01)
*H04N 9/04* (2006.01)
*H04N 5/363* (2011.01)
(Continued)

(52) U.S. Cl.
CPC ............... *H04N 9/045* (2013.01); *H04N 5/363* (2013.01); *H04N 9/8715* (2013.01); *H04N 5/3572* (2013.01)
USPC .................. 348/222.1; 348/231.99; 348/294; 348/242

(58) Field of Classification Search
USPC ................ 348/222.1, 231.99, 294; 250/208.1
See application file for complete search history.

(56) References Cited

U.S. PATENT DOCUMENTS 7,075,569 B2    7/2006 Niikawa
2003/0234879 A1*  12/2003 Whitman et al. ............. 348/242
(Continued)

FOREIGN PATENT DOCUMENTS

JP    10-271519 A    9/1998
JP    2003-169255 A    6/2003
(Continued)

OTHER PUBLICATIONS

International Search Report; International Application No. PCT/JP2009/061640; International Filing Date: Sep. 15, 2009.
(Continued)

*Primary Examiner* — Joel Fosselman
(74) *Attorney, Agent, or Firm* — Rader, Fishman & Grauer PLLC

(57) ABSTRACT

An image signal correcting device (15) has at least a color mixing corrector (151) that receives an image signal arising from photoelectric conversion by a color imaging element (12), and corrects a color mixing component included in this image signal, and a storage unit (153) that stores a color mixing correction coefficient set in advance for each of a plurality of areas segmented in matching with the imaging plane of the imaging element (12). The color mixing corrector (151) approximates the color mixing correction coefficient read out from the storage unit (153) by interpolation to acquire a color mixing rate at the necessary pixel position in color mixing correction, and corrects the color mixing component by using the acquired color mixing rate.

15 Claims, 13 Drawing Sheets

PIXEL R

PIXEL G

PIXEL B

THE AMOUNT OF COLOR MIXING FROM ADJACENT R PIXEL

(51) Int. Cl.
*H04N 9/87* (2006.01)
*H04N 5/357* (2011.01)

(56) References Cited

U.S. PATENT DOCUMENTS

| | | | |
|---|---|---|---|
| 2006/0038825 A1* | 2/2006 | Sakashita | 345/592 |
| 2006/0098240 A1 | 5/2006 | Funamoto | |
| 2007/0153096 A1 | 7/2007 | Hamano et al. | |
| 2007/0195181 A1 | 8/2007 | Onomura | |
| 2011/0058072 A1 | 3/2011 | Wang et al. | |

FOREIGN PATENT DOCUMENTS

| | | |
|---|---|---|
| JP | 2006-121612 A | 5/2006 |
| JP | 2006-134157 A | 5/2006 |
| JP | 2006-323820 A | 11/2006 |
| JP | 2007-142697 A | 6/2007 |
| JP | 2008-113236 A | 5/2008 |
| WO | WO-2009/142641 A1 | 11/2009 |

OTHER PUBLICATIONS

Japanese Office Action issued Sep. 11, 2012 for corresponding Japanese Application No. 2008-171760.

Extended European Search Report issued Sep. 25, 2012 for corresponding European Application No. 09 77 3389.

Getman, Alexander et al. "Crosstalk, Color Tint and Shading correction for small Pixel Size Image Sensor" 2007 International Image Sensor Workshop, Jun. 10, 2007, pp. 166-169, XP55037670.

* cited by examiner

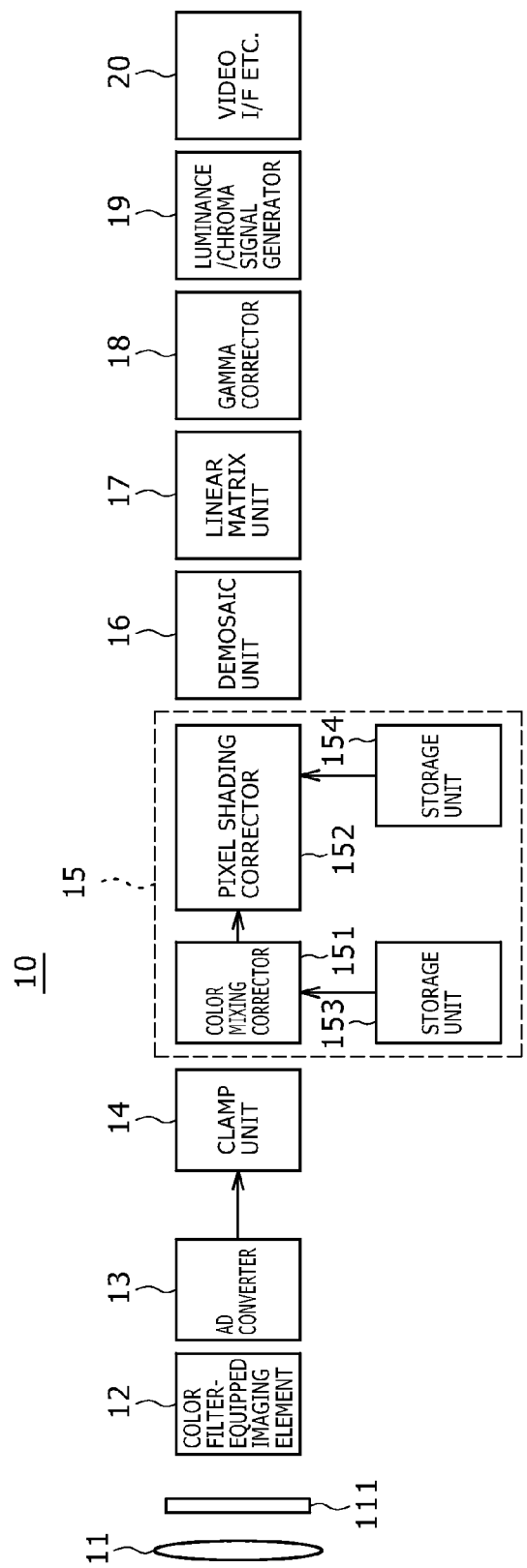
F I G . 1

BAYER ARRAY

INDEX DENOTES PIXEL

INDEX DENOTES PIXEL

FIG.9
(A)
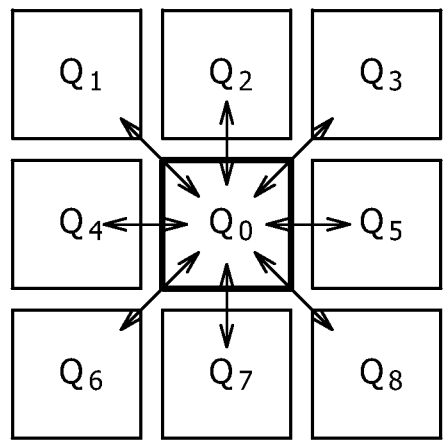
INPUT SIGNALS OF SENSOR
(IMMEDIATELY AFTER PASSAGE
THROUGH COLOR FILTER)
(B)
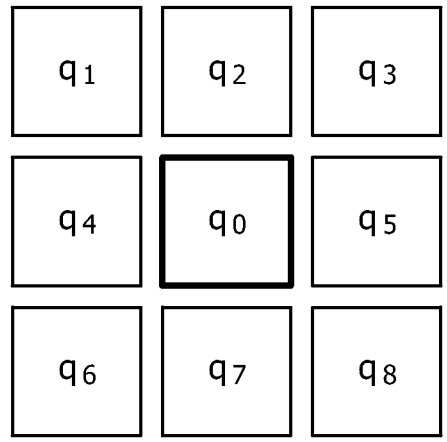
OUTPUT SIGNALS OF SENSOR

FIG.14

| $\theta_0$ | $\theta_1$ | $\theta_2$ | $\theta_3$ | $\theta_4$ |
|---|---|---|---|---|
| $\theta_5$ | $\theta_6$ | $\theta_7$ | $\theta_8$ | $\theta_9$ |
| $\theta_{10}$ | $\theta_{11}$ | $\theta_{12}$ | $\theta_{13}$ | $\theta_{14}$ |
| $\theta_{15}$ | $\theta_{16}$ | $\theta_{17}$ | $\theta_{18}$ | $\theta_{19}$ |

IMAGE SIGNAL CORRECTING DEVICE, IMAGING DEVICE, IMAGE SIGNAL CORRECTING METHOD, AND PROGRAM

CROSS REFERENCES TO RELATED APPLICATIONS

This is a Continuation of application Ser. No. 12/737,117, filed on Dec. 9, 2014, now U.S. Pat. No. 8,860,853 which issued on Oct. 14, 2010, which is a Nationalization of Application No. PCT/JP09/061640, filed Jun. 25, 2009, which contains subject matter related to Japanese Patent Application No. 2008-171760, as filed in the Japan Patent Office on Jun. 3, 2011. All of the above applications are incorporated herein by reference.

TECHNICAL FIELD

The present invention relates to an image signal correcting device, an imaging device, an image signal correcting method, and a program that correct color mixing (color crosstalk) between adjacent pixels and so forth in an imaging device having a solid-state imaging element such as a CMOS image sensor.

BACKGROUND ART

In general, in an imaging element such as a CMOS (Complementary Metal Oxide Semiconductor) image sensor (CIS), color mixing (color crosstalk) affected by adjacent pixels occurs.

In a rough classification, the color mixing is divided into electrical color mixing attributed to the entry of a diffused charge inside the substrate and optical color mixing in which incident light leaks into an adjacent pixel due to diffused reflection or the like.

These color mixings are a factor in adversely affecting the image quality, such as deteriorating the color reproducibility.

So, there have been proposed a technique of providing each color with a coefficient for color mixing correction to enable in-plane uniform correction, a technique of similarly carrying out in-plane uniform correction by the F-number, and so forth (refer to e.g. patent document 1).

Furthermore, in general, simultaneously with the color mixing, the amount of light that does not contribute to photoelectric conversion of a photodiode exists in the pixel due to light absorption and so forth, and vignetting occurs on a pixel-by-pixel basis.

Such vignetting is referred to as pixel shading and is influenced by interface reflection, light absorption into poly-silicon or the like forming a transistor, and so forth. The pixel shading has in-plane distribution similarly to the color mixing and is a factor in deteriorating the image quality.

So, there have been proposed correcting devices in which the distribution in the imaging plane is considered only about this pixel shading (refer to patent documents 2 and 3). They are systems to carry out shading correction of a signal from the sensor output obtained with the color mixing ignored.

PRIOR ART DOCUMENTS

Patent Documents

Patent Document 1: Japanese Patent Laid-open No. Hei 10-271519
Patent Document 2: Japanese Patent Laid-open No. 2003-169255
Patent Document 3: Japanese Patent Laid-open No. 2006-134157

SUMMARY OF THE INVENTION

Technical Problem

However, in a small camera and the like incorporated in a cellular phone, the difference in the incidence angle between the center pixel of the sensor and the peripheral pixel is becoming large (the main light beam is more inclined at a pixel closer to the periphery) due to miniaturization of the pixel pitch and shortening of the exit pupil distance.

Therefore, as the position of the pixel becomes closer to the periphery, entry of light into an adjacent pixel increases. Furthermore, because the structure of the Al interconnect to an adjacent pixel and so forth is not symmetric on a pixel-by-pixel basis between the microlens and the photodiode, diffused reflection of light occurs in a complex manner until the light reaches the photodiode.

That is, because of these factors, the color mixing rate is becoming not in-plane uniform. Therefore, in-plane uniform correction of the color mixing is becoming difficult.

Furthermore, the correcting devices disclosed in patent documents 2 and 3 are systems to carry out shading correction of a signal from the sensor output obtained with the color mixing ignored.

In general, the color mixing depends on the process of light absorption from peripheral pixels, and the shading depends on the process of light dissipation of the subject pixel. Therefore, both can not be equivalent to each other in terms of thermodynamics.

However, in the shading correcting systems in the above-described prior documents, only the light dissipation process is taken into consideration, and displacement in the absorption process is not taken into consideration. Thus, it is difficult to estimate the correct amount of signal.

Therefore, it is difficult for the above-described shading correcting systems to carry out correction with high accuracy.

The present invention is to provide an image signal correcting device, an imaging device, an image signal correcting method, and a program that can realize in-plane uniform correction of color mixing and are capable of realizing correction with high accuracy.

Technical Solution

An image signal correcting device of a first aspect of the present invention has at least a color mixing corrector that receives an image signal arising from photoelectric conversion by a color imaging element, and corrects a color mixing component included in the image signal, and a storage unit that stores a color mixing correction coefficient set in advance for each of a plurality of areas segmented in matching with an imaging plane of the imaging element. The color mixing corrector approximates the color mixing correction coefficient read out from the storage unit by interpolation to acquire a color mixing rate at a necessary pixel position in color mixing correction, and corrects the color mixing component by using the acquired color mixing rate.

An imaging device of a second aspect of the present invention has a color imaging element that captures a subject image, and an image signal correcting device that receives an image signal arising from photoelectric conversion by the color imaging element and carries out correction. The image signal correcting device has at least a color mixing corrector that corrects a color mixing component included in an image signal arising from photoelectric conversion by the color imaging element, and a storage unit that stores a color mixing correction coefficient set in advance for each of a plurality of areas segmented in matching with an imaging plane of the imaging element. The color mixing corrector approximates the color mixing correction coefficient read out from the storage unit by interpolation to acquire a color mixing rate at a necessary pixel position in color mixing correction, and corrects the color mixing component by using the acquired color mixing rate.

Preferably, the color mixing corrector sets a plurality of representative points and carries out interpolation among representative points to decide the color mixing rate of each pixel.

Preferably, the color mixing corrector carries out color mixing correction by performing a multiply-accumulate operation of acquired color mixing rates and input image signals and executing subtraction processing of an input image signal and a result of the multiply-accumulate operation.

Preferably, the color mixing correction coefficient stored in the storage unit is measured and stored in advance as the color mixing rate of another color pixel from one color pixel.

Preferably, the image signal correcting device and the imaging device further have a shading corrector that receives an image signal for which color mixing correction has been carried out by the color mixing corrector, and carries out pixel shading correction for the image signal for which color mixing correction has been carried out.

Preferably, the image signal correcting device and the imaging device have a second storage unit that stores a pixel shading correction coefficient set in advance for each of a plurality of areas segmented in matching with the imaging plane of the imaging element. The shading corrector approximates the pixel shading correction coefficient stored in the second storage unit by interpolation to acquire a correction coefficient at a necessary pixel position, and carries out shading correction by using the acquired correction coefficient.

Preferably, the shading corrector carries out shading correction by performing accumulation of the acquired correction coefficient and the image signal for which color mixing correction has been carried out.

An image signal correcting method of a third aspect of the present invention has a step of reading out, from a storage unit, a color mixing correction coefficient set in advance for each of a plurality of areas segmented in matching with an imaging plane of a color imaging element, a step of receiving an image signal arising from photoelectric conversion by the imaging element, and approximating the color mixing correction coefficient read out from the storage unit by interpolation to acquire a color mixing rate at a necessary pixel position, and a step of correcting a color mixing component by using the acquired color mixing rate.

A fourth aspect of the present invention is a program causing a computer to execute image signal correction processing having processing of reading out, from a storage unit, a color mixing correction coefficient set in advance for each of a plurality of areas segmented in matching with an imaging plane of a color imaging element, processing of receiving an image signal arising from photoelectric conversion by the imaging element, and approximating the color mixing correction coefficient read out from the storage unit by interpolation to acquire a color mixing rate at a necessary pixel position, and processing of correcting a color mixing component by using the acquired color mixing rate.

According to the present invention, the image signal arising from photoelectric conversion by the color imaging element is input to the color mixing corrector.

In the color mixing corrector, the color mixing correction coefficient read out from the storage unit is approximated by interpolation and the color mixing rate at the necessary pixel position is acquired in color mixing correction.

Furthermore, in the color mixing corrector, the color mixing component is corrected by using the acquired color mixing rate.

Advantageous Effects

According to the present invention, color mixing correction can be realized appropriately for in-plane distribution, and correction with high accuracy can be realized.

BRIEF DESCRIPTION OF DRAWINGS

FIG. 1 is a block diagram showing a configuration example of an imaging device to which an image signal correcting device relating to an embodiment of the present invention is applied.

FIG. 9 is a diagram showing examples of input/output signals of the imaging element (sensor).

FIG. 14 is a diagram for explaining an example of estimation of color mixing rates θ by representative points.

MODE FOR CARRYING OUT THE INVENTION

Figure 2:
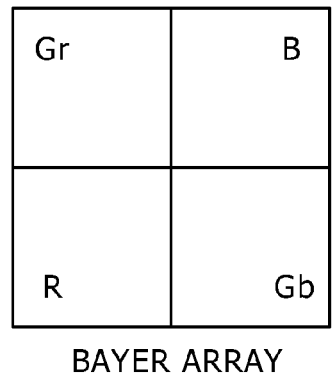
FIG. 2 is a diagram showing the Bayer array as a pixel array example.

An embodiment of the present invention will be described below in association with the drawings.

FIG. 1 is a block diagram showing a configuration example of an imaging device to which an image signal correcting device relating to the embodiment of the present invention is applied.

As shown in FIG. 1, the present imaging device 10 has a lens system 11, an imaging element 12, an A/D converter 13, a clamp unit 14, an image signal correcting device 15, a demosaic unit 16, a linear matrix unit 17, a gamma corrector 18, and a luminance/chroma signal generator 19.

Furthermore, a video interface (I/F) 20 is disposed on the output side of the luminance/chroma signal generator 19.

The lens system 11 includes a diaphragm 111 and forms a subject image on the imaging plane of the imaging element 12.

The imaging element 12 is formed of a CMOS image sensor or the like, and plural unit pixels are arranged in a matrix. A color filter is disposed corresponding to each pixel.

As the pixel array of the imaging element 12, e.g. the Bayer array like that shown in FIG. 2 is employed.

Figure 3:
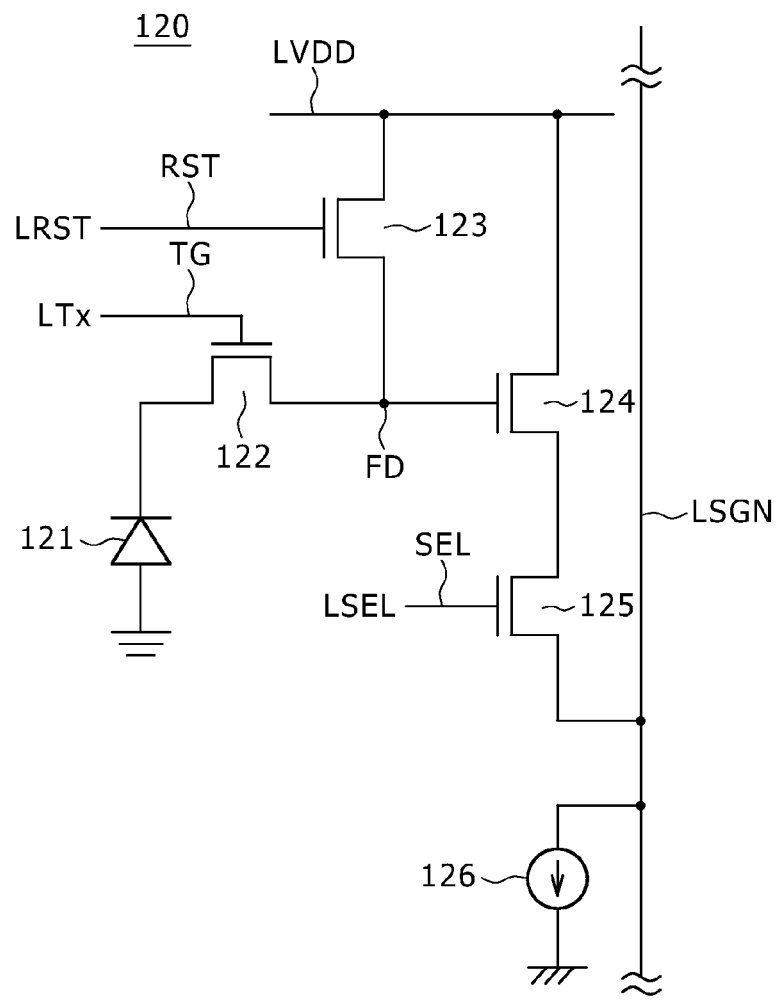
FIG. 3 is a circuit diagram showing a configuration example of the unit pixel of an imaging element relating to the present embodiment.

FIG. 3 is a circuit diagram showing a configuration example of the unit pixel of the imaging element 12 relating to the present embodiment.

FIG. 3 shows one example of the pixel of the CMOS image sensor that relates to the present embodiment and is composed of four transistors.

As shown in FIG. 3, each pixel 120 has a photoelectric conversion element 121 formed of e.g. a photodiode.

Furthermore, for this one photoelectric conversion element 121, the pixel 120 has four transistors of a transfer transistor 122, a reset transistor 123, an amplification transistor 124, and a selection transistor 125 as active elements.

The photoelectric conversion element 121 carries out photoelectric conversion of incident light to a charge (here, electrons) having the amount dependent on the amount of light thereof.

The transfer transistor 122 is connected between the photoelectric conversion element 121 and a floating diffusion FD, and a transmission signal TG as a control signal is given to the gate (transfer gate) thereof via a transfer control line LTx.

Thereby, the transfer transistor 122 transfers the electrons arising from the photoelectric conversion by the photoelectric conversion element 121 to the floating diffusion FD.

The reset transistor 123 is connected between a power supply line LVDD and the floating diffusion FD, and a reset signal RST as a control signal is given to the gate thereof via a reset control line LRST.

Thereby, the reset transistor 123 resets the potential of the floating diffusion FD to the potential of the power supply line LVDD.

The gate of the amplification transistor 124 is connected to the floating diffusion FD. The amplification transistor 124 is connected to a signal line LSGN via the selection transistor 125, and forms a source follower with a constant current source 126 outside the pixel part.

Furthermore, a selection signal SEL as a control signal corresponding to an address signal is given to the gate of the selection transistor 125 via a selection control line LSEL, so that the selection transistor 125 is turned on.

If the selection transistor 125 is turned on, the amplification transistor 124 amplifies the potential of the floating diffusion FD and outputs the voltage dependent on the potential to the signal line LSGN. The voltages output from the respective pixels via the signal lines LSGN are output to a column readout circuit.

These operations are simultaneously carried out for the respective pixels on one row because the respective gates of the transfer transistor 122, the reset transistor 123, and the selection transistor 125 are connected on a row-by-row basis for example.

For the imaging element 12, the reset control line LRST, the transfer control line LTx, and the selection control line LSEL, which are wired in the pixel array unit, are wired as one set in units of each row of the pixel array.

These reset control line LRST, transfer control line LTx, and selection control line LSEL are driven by a vertical scan circuit, which is not diagrammatically represented.

Furthermore, the signal line LSGN is connected to the column readout circuit including a CDS circuit (correlated double sampling circuit) and so forth.

Figure 4:
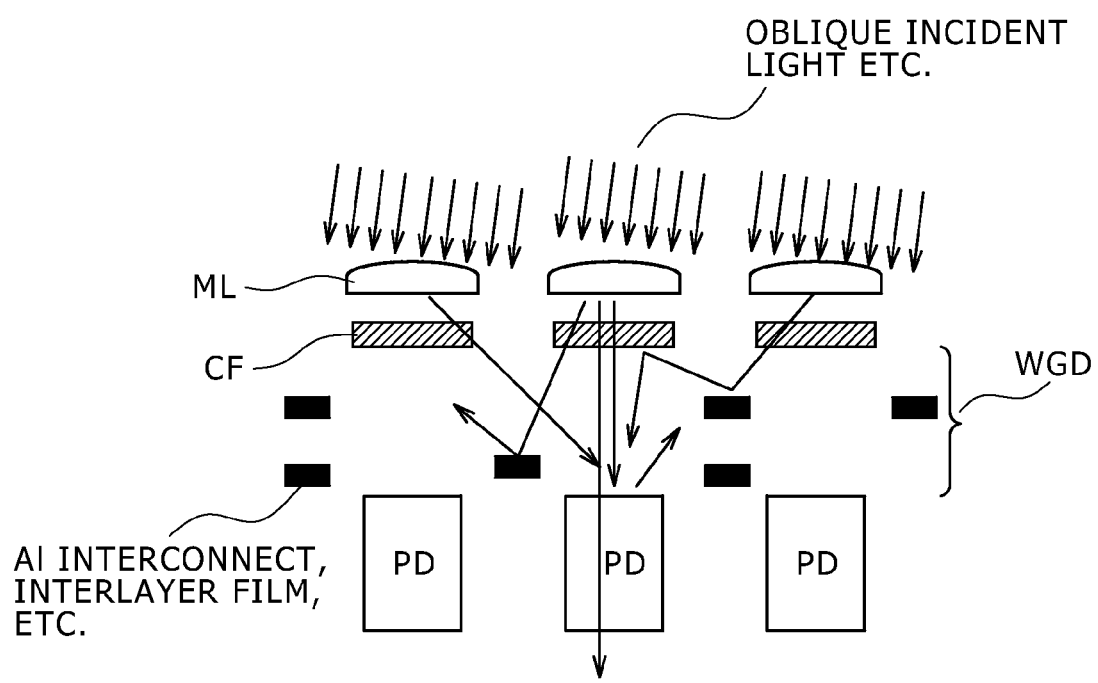
FIG. 4 is a diagram for schematically showing the device structure of the imaging element and explaining color mixing.

FIG. 4 is a diagram for schematically showing the device structure of the imaging element and explaining color mixing.

In FIG. 4, the imaging element 12 has a multilayer interconnect structure in which color filters CF are disposed for the light receiving planes of photodiodes PD as photoelectric conversion elements with the intermediary of a waveguide WGD and microlenses ML are each positioned on the light incident side of a respective one of the color filters CF.

In the waveguide WGD, Al interconnects, interlayer films, etc. are formed.

The color mixing is frequently observed in an imaging element having a multilayer interconnect structure, such as a CMOS image sensor. A major cause is the passage of a diffusedly-reflected component of oblique incident light through the Al light-blocking film and the leakage of the diffusedly-reflected component into an adjacent pixel.

Here, this is referred to as optical color mixing.

In addition, color mixing due to electron diffusion between the photodiodes PD, and so forth, also exists. However, it is not a major factor in the color mixing in the present process.

In the color mixing phenomenon, due to diffused reflection in the waveguide WGD forming the path from the color filter CF to the photodiode PD, income and outgo of light that is incident from a peripheral pixel and/or dissipated to a peripheral pixel occur in a complex manner by the time the light reaches the photodiode PD.

In general, the pixel structure is not symmetric between adjacent pixels, and therefore estimation of the diffused reflection is also difficult.

A detailed description will be made later about color mixing correction and shading correction in the present invention.

The A/D converter 13 converts an image signal by the imaging element 12 from an analog signal to a digital signal and outputs the signal to the clamp unit 14.

The clamp unit 14 corrects the black level of the digital image signal by the A/D converter 13 and outputs the signal to the image signal correcting device 15.

The image signal correcting device 15 uses an effective color mixing rate θ estimated for each of areas segmented in a matrix manner (mesh manner) in matching with the imaging plane of the imaging element 12, and carries out color mixing correction in which the color mixing rate is associated with θ obtained by approximating θ at the necessary pixel position (coordinates) by interpolation.

The image signal correcting device 15 carries out shading correction for the image signal for which the color mixing correction has been carried out.

In the color mixing correction and the shading correction, the image signal correcting device 15 makes segmentation in a matrix manner (mesh manner) in matching with the imaging plane (correction-subject plane) of the imaging element 12 for example, and performs so-called B-spline interpolation by using the respective weighting factors for plural representative points in units of meshes.

As shown in FIG. 1, the image signal correcting device 15 has a color mixing corrector 151, a pixel shading corrector 152, a first storage unit 153, and a second storage unit 154.

In the storage unit 153, the effective color mixing rates θ estimated for each of the areas segmented in a matrix manner (mesh manner) in matching with the imaging plane of the imaging element 12 are stored.

The color mixing corrector 151 calculates θ at the pixel position (coordinates) necessary in the color mixing correction, using the color mixing rates θ stored in the storage unit 153, through approximation by interpolation, and carries out the color mixing correction by using this approximated color mixing rate θ.

The color mixing corrector 151 carries out the color mixing correction by performing B-spline interpolation with use of the color mixing rate (correction coefficient) stored in the storage unit 153.

In the storage unit 154, correction coefficients defined for each of areas segmented in a matrix manner (mesh manner) in matching with the imaging plane of the imaging element 12 are stored.

The shading corrector 152 carries out the shading correction by performing B-spline interpolation with use of the correction coefficient stored in the storage unit 154.

The color mixing correction and the shading correction in the image signal correcting device 15 will be further described in detail later.

The image signal correcting device 15 outputs, to the demosaic unit 16, the image signal for which the shading correction has been carried out after the color mixing correction has been carried out.

The image signal for which the shading correction has been carried out after the color mixing correction has been carried out is subjected to synchronization processing in the demosaic unit 16 and subjected to color reproduction processing in the linear matrix unit 17. Thereafter, the signal is subjected to gamma correction in the gamma corrector 18 and then supplied to the luminance/chroma signal generator 19.

Subsequently, a luminance signal and a chroma signal are generated by the luminance/chroma signal generator 19, and video is displayed on a display device, which is not diagrammatically represented, via the video I/F 20.

About the color mixing correction and the shading correction in the image signal correcting device 15, a specific description will be made below, including a principle description.

Figure 5:
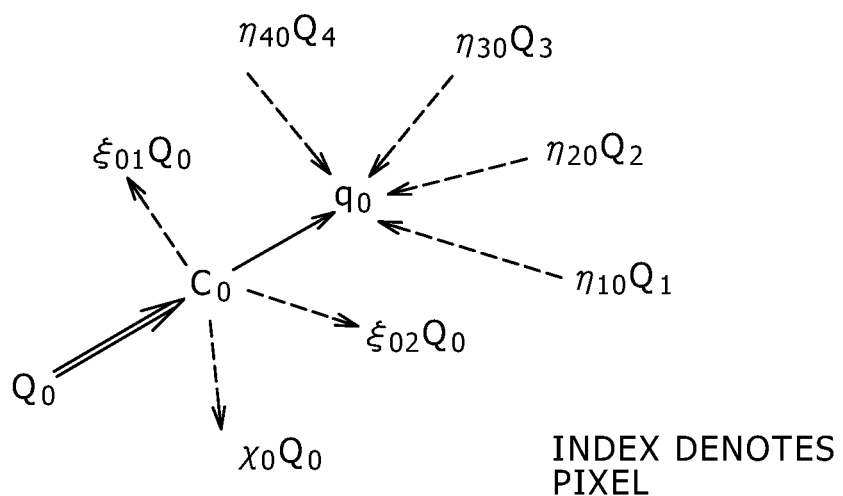
FIG. 5 is an image diagram of the process of dissipation and absorption of light.

FIG. 5 is an image diagram of the process of dissipation and absorption of light.

Figure 6:
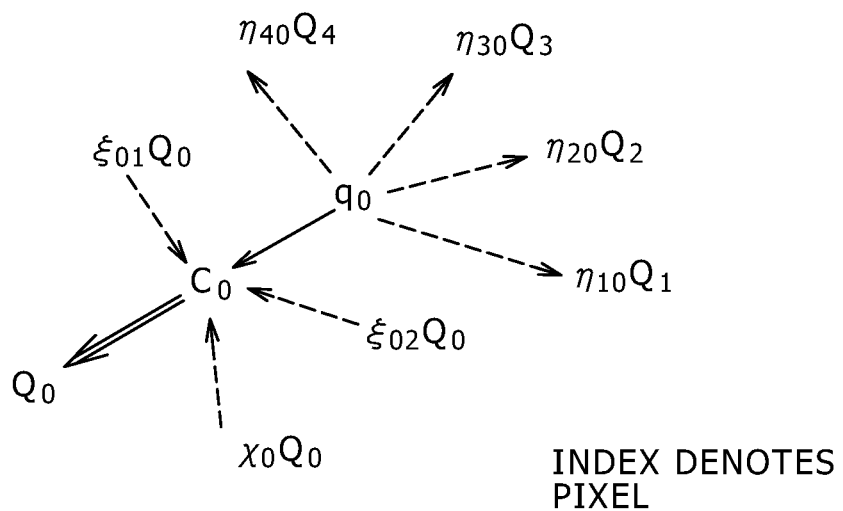
FIG. 6 is an image diagram of the reverse process of dissipation and absorption of light.

FIG. 6 is an image diagram of the reverse process of dissipation and absorption of light.

FIG. 5 shows the process of dissipation and absorption of light $q_0$ from incident light $Q_0$ to a timing immediately before photoelectric conversion at a pixel 0 ($Q_0 \rightarrow q_0$).

FIG. 6 shows the reverse process to the incident light $Q_0$ at the pixel 0 ($q_0 \rightarrow Q_0$).

In this case, the dissipation process (vignetting) and the absorption process (color mixing) are not identical to each other. That is, dissipation process (vignetting)≠absorption process (color mixing).

As shown in FIG. 5, the color mixing depends on the process of light absorption from peripheral pixels, and the shading depends on the process of light dissipation of the subject pixel. Therefore, both can not be equivalent to each other in terms of thermodynamics.

Therefore, as shown in FIG. 6, if the process of dissipation and absorption of light is reversely traced, it turns out that the correction must be carried out in the following order: initially the amount of absorption from peripheral pixels is corrected (this is referred to as the color mixing correction) and then the amount of light dissipation is corrected (this is referred to as the pixel shading correction).

In the shading correcting system in the existing technique, only the light dissipation process is taken into consideration, and displacement in the absorption process is not taken into consideration. Thus, it can be said in principle that the correct amount of signal can not be estimated.

That is, it can be said that the color mixing and the pixel shading need to be so corrected that both are exclusive of each other and a system in which this point is taken into consideration is essential.

That is, it turns out that the color mixing correction and the shading correction must be independently carried out in the order from color mixing correction to shading correction.

The image signal correcting device 15 of the present embodiment is so configured as to carry out the shading correction after carrying out the color mixing correction.

Here, modeling of optical color mixing will be attempted.

Figure 7:
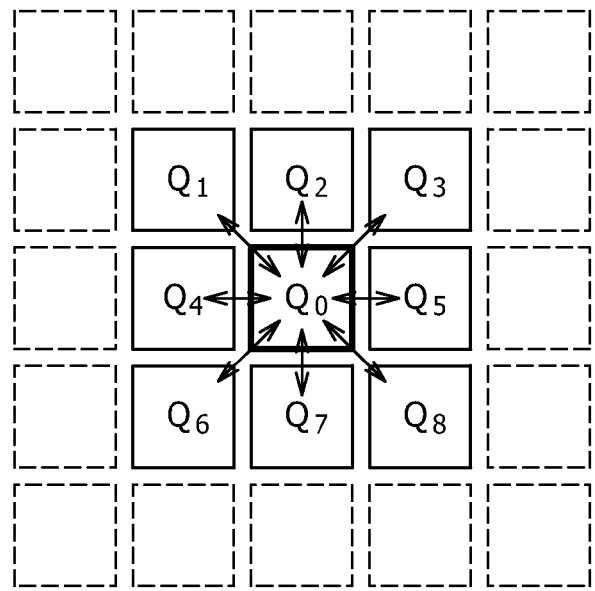
FIG. 7 is a diagram showing a model of color mixing among pixels.

FIG. 7 is a diagram showing a model of color mixing among pixels.

Figure 8:
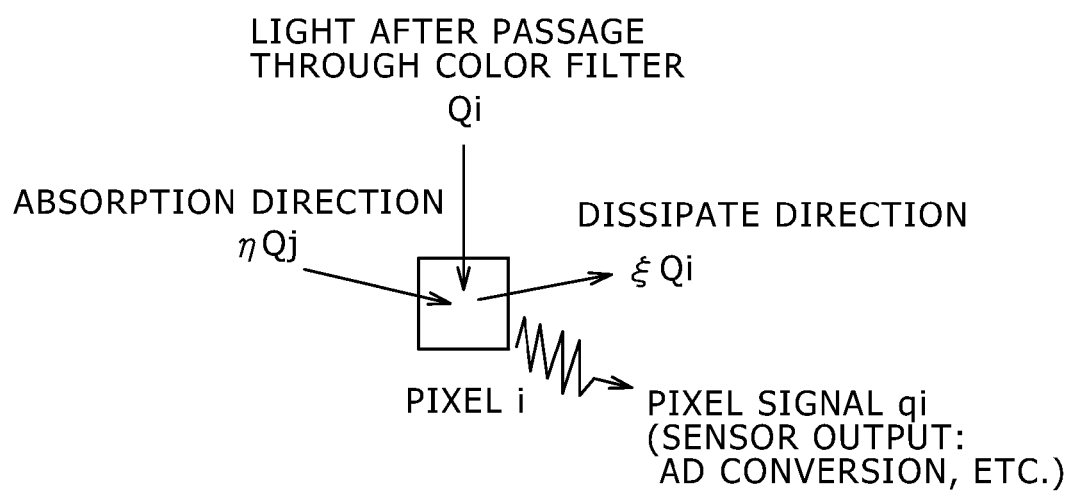
FIG. 8 is a diagram showing a model of dissipation and absorption of light at each pixel.

FIG. 8 is a diagram showing a model of dissipation and absorption of light at each pixel.

To represent the income and outgo of the amount of light of the subject pixel with number 0 in FIG. 7, by coefficients (ξ, η) in proportion to the amount $Q_i$ of light immediately after passage through each color filter, the amounts of light scattering and light absorption occurring in the optical path (path from the color filter to the photodiode) are defined as $\xi Q_i$ and $\eta Q_j$, respectively, as shown in FIG. 8.

Here, $\xi Q_i$ denotes the amount of light dissipated from a pixel i to a peripheral pixel or voltage. $\eta Q_j$ denotes the amount of light that is diffusedly reflected from a pixel j and incident or voltage (=the amount of light absorption of the pixel i or voltage). $q_i$ denotes the amount of sensor output signal of the pixel i (the amount of light or voltage or a digital signal value).

Furthermore, FIGS. 9(A) and (B) are diagrams showing examples of input/output signals of the imaging element (sensor) 12. FIG. 9(A) shows input signals of the imaging element (sensor) 12 immediately after passage through the color filter, and FIG. 9(B) shows output signals of the imaging element (sensor) 12.

If this color mixing model is formulated, the following equation is obtained.

[Expression 1]

$$q_0 = Q_0 - \sum_{j=1}^{n} \xi_{0j} Q_0 + \sum_{j=1}^{n} \eta_{j0} Q_j - \chi_0 Q_0 \quad \text{(Equation 1)}$$

Model of the Amount of Pixel Signal

Here, $q_0$ denotes the voltage after photoelectric conversion for the subject pixel or the amount of digital signal resulting from AD conversion of the voltage.

$Q_0$ denotes the amount obtained by converting, into voltage, the amount of light of the subject pixel immediately after passage through the color filter or the amount of digital signal resulting from AD conversion of the amount.

$Q_j$ denotes the amount obtained by converting, into voltage, the amount of light of a pixel adjacent to the subject pixel immediately after passage through the color filter or the amount of digital signal resulting from AD conversion of the amount.

$\xi_{0j}$ denotes a dimensionless coefficient obtained by dividing the amount of light dissipated from the subject pixel to the periphery (=the amount of partial light of $Q_0$ that does not contribute to the amount $q_0$ of signal of the subject pixel) by the amount $Q_0$ of incident light of the subject pixel. In general, $0.0 < \xi_{0j} < 1.0$ holds.

$\eta_{j0}$ denotes a dimensionless coefficient obtained by dividing the amount of light scattered from the periphery to the subject pixel (=the amount of partial light from the periphery $Q_j$ that contributes to the amount $q_0$ of signal of the subject pixel besides $Q_0$) by the amount $Q_j$ of incident light of each peripheral pixel. In general, $0.0 < \eta_{j0} < 1.0$ holds.

$\eta_0$ is an absorption coefficient and denotes the rate of absorption with respect to $Q_0$, having no relation to income and outgo of the amount of light between the subject pixel and the peripheral pixels and having no contribution to the amount $q_0$ of signal of the subject pixel (example: absorption into poly-silicon of a transistor in the pixel periphery, or the like). Here, $0 < \eta_0 < 1$ holds.

n denotes the number of pixels adjacent to the subject pixel.

By transforming Equation 1, the amount of signal by pixel incident light can be represented as shown in Equation 2.

[Expression 2]

$$Q_0 = \frac{q_0 - \sum_{j=1}^{n} \eta_{j0} Q_j}{1 - \sum_{j=1}^{n} \xi_{0j} - \chi_0} \quad \text{(Equation 2)}$$

the Amount of Signal by Pixel Incident Light . . . . Transformation of Equation 1

Equation 2 denotes the amount of signal resulting from correction of scattering and absorption of light occurring in the optical path.

The optical path is the optical route in the waveguide WGD forming the path from the color filter CF to the photodiode PD in FIG. 4.

That is, the denominator of Equation 2 means pixel shading correction for correcting the amount that does not contribute to the signal component of the subject pixel because of light dissipation.

The numerator of Equation 2 means that the amount of color mixing in which light scattered from peripheral pixels contributes to the signal component of the subject pixel is corrected.

Incidentally, the pixel shading is so-called vignetting in the pixel. Here, this shading is referred to as the pixel shading for discrimination from lens shading.

Next, a formula of color mixing correction will be described.

The amount $C_0$ of signal after color mixing correction is represented as follows through transformation of Equation 2.

[Expression 3]

$$C_0 = \left(1 - \sum_{j=1}^{n} \xi_{0j} - \chi_0\right) Q_0 = q_0 - \sum_{j=1}^{n} \eta_{j0} Q_j \quad \text{(Equation 3)}$$

The second term of the right side of Equation 3 means that the peripheral pixels (n pixels) of the subject pixel with number 0 are subjected to a multiply-accumulate operation by $\xi \eta Q$.

In the model in the embodiment of the present invention, as is apparent from Equation 3, $Q_0$ of the subject pixel is obtained if initially color mixing correction is carried out and substantially pixel shading correction is carried out.

Incidentally, $Q_j$ existing in the right side of Equation 3 is the amount of light immediately after passage through the color filter like that shown in FIG. 9(A), and therefore is generally an unmeasurable amount.

Therefore, there is a need to separately expand the equation like Equations 4 to 6 shown later by the measurable sensor output $q_j$ like that shown in FIG. 9(B).

Figure 10:
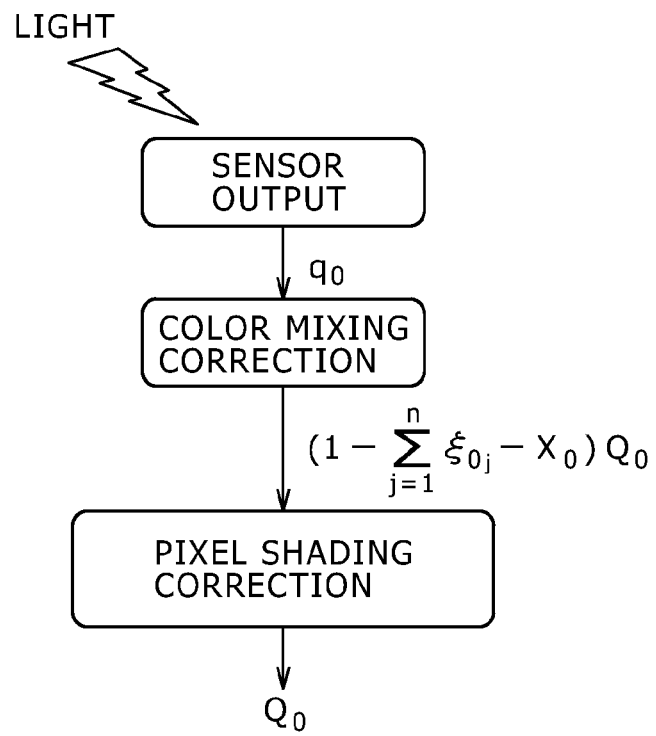
FIG. 10 is a diagram showing the flow of signal processing by the image signal correcting device relating to the present embodiment.

FIG. 10 is a diagram showing the flow of signal processing by the image signal correcting device 15 relating to the present embodiment.

Figure 11:
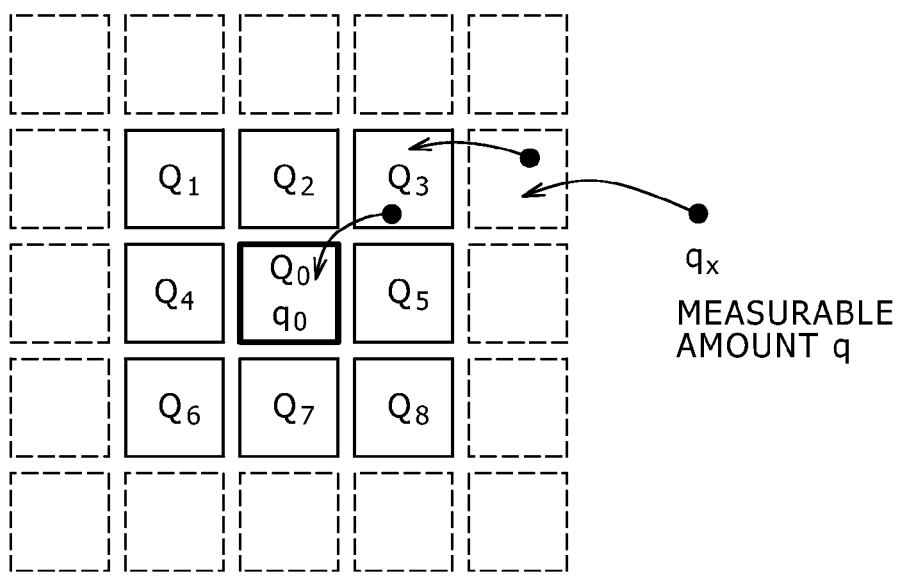
FIG. 11 is a diagram showing correction processing corresponding to model Equation 2.

FIG. 11 is a diagram showing the correction processing corresponding to model Equation 2.

It turns out that, by carrying out the color mixing correction for a certain sensor output $q_0$ in the image signal correcting device 15 of the present embodiment as shown in FIG. 10, the pixel shading correction at the subsequent stage can be correctly carried out.

It turns out that, if the present signal processing is not executed (is skipped), the term of $\Sigma \eta Q$ is amplified by the amount equivalent to the shading gain and $Q_0$ can not be correctly reproduced finally as is apparent from Equation 3.

If Equation 2 is expanded by the measurable amount q of the adjacent pixel on the bases of the above-described points, the following Equation 4 is obtained.

[Expression 4]

$$Q_0 = \frac{q_0 - \sum_{j=1}^{n} \eta_{j0} \frac{q_j - \sum_{k=1}^{n} \eta_{kj} Q_k}{1 - \sum_{k=1}^{n} \xi_{jk} - \chi_j}}{1 - \sum_{j=1}^{n} \xi_{0j} - \chi_0} \quad \text{(Equation 4)}$$

This Equation 4 is a recurrence relation by which, as shown in FIG. 11, color mixing correction and shading correction of adjacent, second-adjacent, third-adjacent pixels . . . are sequentially carried out from pixels farther from the subject pixel and correction for the subject pixel with number 0 is carried out at last.

Similarly, if Equation 3, which is the formula of color mixing correction, is expanded by using the measurable amount $q_j$ of the adjacent pixel, the following Equation 5 is obtained.

[Expression 5]

$$C_0 = \left(1 - \sum_{j=1}^{n} \xi_{0j} - \chi_0\right) Q_0 = q_0 - \sum_{j=1}^{n} \beta_{j0} q_j + \sum_{j=1}^{n} \sum_{k=1}^{n} \beta_{j0} \eta_{kj} Q_k \quad \text{(Equation 5)}$$

Here, $\beta_{j0} = \dfrac{\eta_{j0}}{1 - \sum_{k=1}^{n} \xi_{jk} - \chi_j}$

Moreover, if this Equation 5 of color mixing correction is expanded to adjacent and second-adjacent pixels, the following Equation 6 is obtained.

[Expression 6]

(Equation 6)

$$C_0 = \left(1 - \sum_{j=1}^{n}\xi_{0j} - \chi_0\right)Q_0 = q_0 - \sum_{j=1}^{n}\beta_{j0}q_j +$$

$$\sum_{j=1}^{n}\sum_{k=1}^{n}\beta_{j0}\beta_{kj}q_k - \sum_{j=1}^{n}\sum_{k=1}^{n}\sum_{i=1}^{n}\beta_{j0}\beta_{kj}\beta_{ik}q_i + \underbrace{\sum_{i=1}^{n}\sum_{h=1}^{n}\beta_{ik}\eta_{hi}Q_h}_{\text{Term Including Unmeasurable Amount }Q}$$

The fifth term of the right side of this Equation 6 includes the unmeasurable amount Q.

If the income and outgo of scattering of each pixel is at most about several percentages to ten and several percentages of the amount of light incident on the pixel, $\eta+\Sigma\xi+\eta<1$ holds.

That is, $\beta<1$ holds, and thus the correction C can be sufficiently represented by approximation until $q-\Sigma\beta q$ as is apparent from Equation 6. It can be said that the sensor is a more favorable sensor (imaging element) involving less color mixing and pixel shading when the degree of $\beta\ll1$ is higher.

Therefore, the formula of color mixing correction serving as the basis in the embodiment of the present invention is the underlined part of the following Equation 7.

[Expression 7]

(Equation 7)

$$C_0 = \left(1 - \sum_{j=1}^{n}\xi_{0j} - \chi_0\right)Q_0 = q_0 - \sum_{j=1}^{n}\beta_{j0}q_j + \sum_{j=1}^{n}\sum_{k=1}^{n}\beta_{j0}\eta_{kj}Q_k \sim \underline{q_0 - \sum_{j=1}^{n}\beta_{j0}q_j}$$

The addition part ($\Sigma\beta q$) of the second term of the right side of Equation 7 is the amount itself of color mixing of the subject pixel.

Thus, for example in the imaging element 12 in which color filters of red (R), green (G), and blue (B) are mosaic-arranged, $\beta$ can be obtained in principle by the following method.

To experimentally obtain the amount of color mixing here, hereinafter a definition of $\beta\to\theta$ is made and the addition part of the second term of the right side of Equation 7 is rewritten to $\Sigma\kappa q$. Furthermore, $\theta$ is newly defined as the effective color mixing rate.

Figure 12:
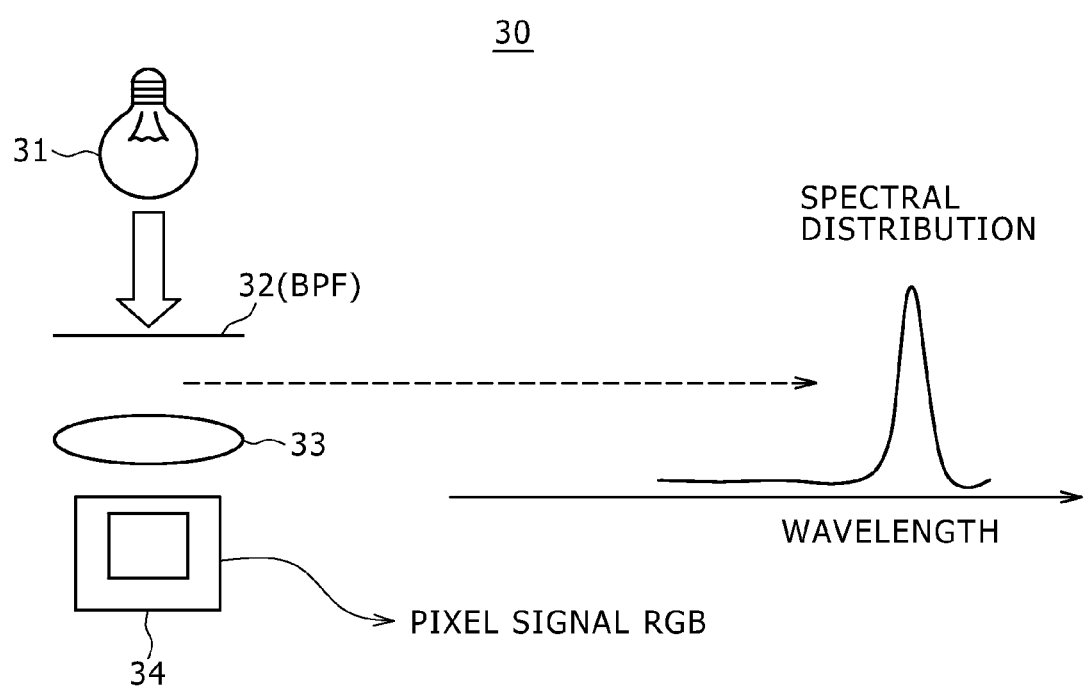
FIG. 12 is a diagram showing one example of a measurement system of the amount of color mixing relating to the present embodiment.

<How to Obtain Color Mixing Rate $\theta$>:

FIG. 12 is a diagram showing one example of the measurement system of the amount of color mixing relating to the present embodiment.

Figure 13:
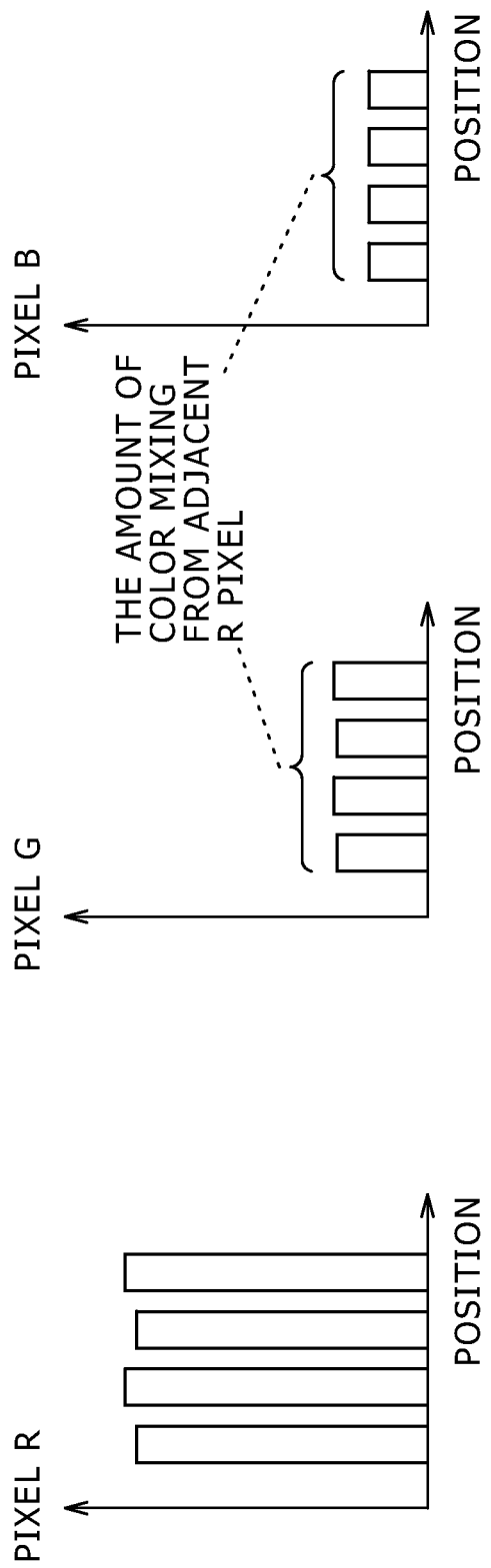
FIG. 13 is a diagram showing the response and the amount of color mixing of each pixel by single-color light R.

FIG. 13 is a diagram showing the response and the amount of color mixing of each pixel by single-color light R.

A measurement system 30 of the amount of color mixing in FIG. 12 is so configured as to include a white light source 31, a band-pass filter (BPF) 32, a lens 33, and an imaging element 34. The imaging element 34 has the same configuration and functions as those of the imaging element 12 in FIG. 1.

For example, as shown in FIG. 12, single-color light arising from passage through the band-pass filter 32 around the waveform of the maximum sensitivity of each color filter CF is prepared. The imaging element 34 is irradiated with the single-color light of each color via the lens 33, and the amount of response of each pixel is obtained.

Furthermore, the amount of color mixing is obtained from the pixel values separately obtained for each of the light sources of the respective colors.

Specifically, when the single-color light R is emitted like in the example of FIG. 13, if the characteristics of the band-pass filter do not contribute to the G pixel and the B pixel, basically the G pixel and the B pixel do not directly respond to the R light because the light is absorbed by the G and B color filters. The single-color light R (light source that provides the maximum sensitivity of the color filter R and has a limit to the wavelength band) is realized by light that is made to pass through a band-pass filter around the R wavelength from a white light source, or the like.

Therefore, under such a condition, the amount of response (the amount of signal) existing in the G pixel and the B pixel is equivalent to the amount of color mixing from the adjacent R pixel as shown in FIG. 13.

Similarly, by emitting G light and B light also to the G pixel and the B pixel, the amount of color mixing can be measured for each other.

For example, the rate $\theta_{RG}$ of color mixing from the R pixel to the G pixel can be obtained by the following Equation 8.

[Expression 8]

(Equation 8)

$$\frac{\left(\begin{array}{c}\text{rate }\theta_{RG}\text{ of color mixing from }R\text{ pixel to }G\text{ pixel} = \\ G\text{ value in irradiation with }R\text{ single-color light}\end{array}\right)}{\text{value of pixel }R\text{ in irradiation with }R\text{ single-color light}}$$

Similarly, the rates of color mixing from the G pixel to the R pixel, from the G pixel to the B pixel, . . . can be obtained for each pixel.

Furthermore, the formula of color mixing correction in the present embodiment can be represented as the following Equation 9 and Equation 10.

[Expression 9]

Formula of Color Mixing Correction (Equation 9)

$$C_0 = q_0 - \sum_{j=1}^{n}\theta_{j0}q_j$$

[Expression 10]

$$\theta_{j0} = \frac{\text{value of pixel } 0}{\text{value of pixel } j} \quad \text{(Equation 10)}$$

denominator and numerator are values in irradiation
with light source that passes through only
color filter of pixel $j$ So far the amount of color mixing is defined for each pixel and the color mixing rate is obtained by measurement.

To hold the color mixing rate of each of all the pixels in this manner and carry out correction, a huge storage unit is necessary. Thus, in the present embodiment, the following method is employed as a preferable method.

Specifically, in this method, representative points are made and the color mixing rates of the respective pixels are decided among the representative points by a method such as spline, Bezier, or linear interpolation.

FIG. 14 is a diagram for explaining an example of estimation of the color mixing rates θ by representative points.

In the image signal correcting device 15, the effective color mixing rates θ estimated for each of areas segmented in a matrix manner (mesh manner) in matching with the imaging plane of the imaging element 12 as shown in FIG. 14 are stored in the storage unit 153.

The example of FIG. 14 is an example of segmentation into a 4×5 matrix manner, and color mixing rates $\theta_0$ to $\theta_{19}$ are shown.

The color mixing corrector 151 calculates θ at the pixel position (coordinates) necessary in the color mixing correction, using the color mixing rates θ stored in the storage unit 153, through approximation by interpolation, and carries out the color mixing correction by using this approximated color mixing rate θ.

The color mixing corrector 151 carries out the color mixing correction in accordance with the above-described Equation 9.

Figure 15:
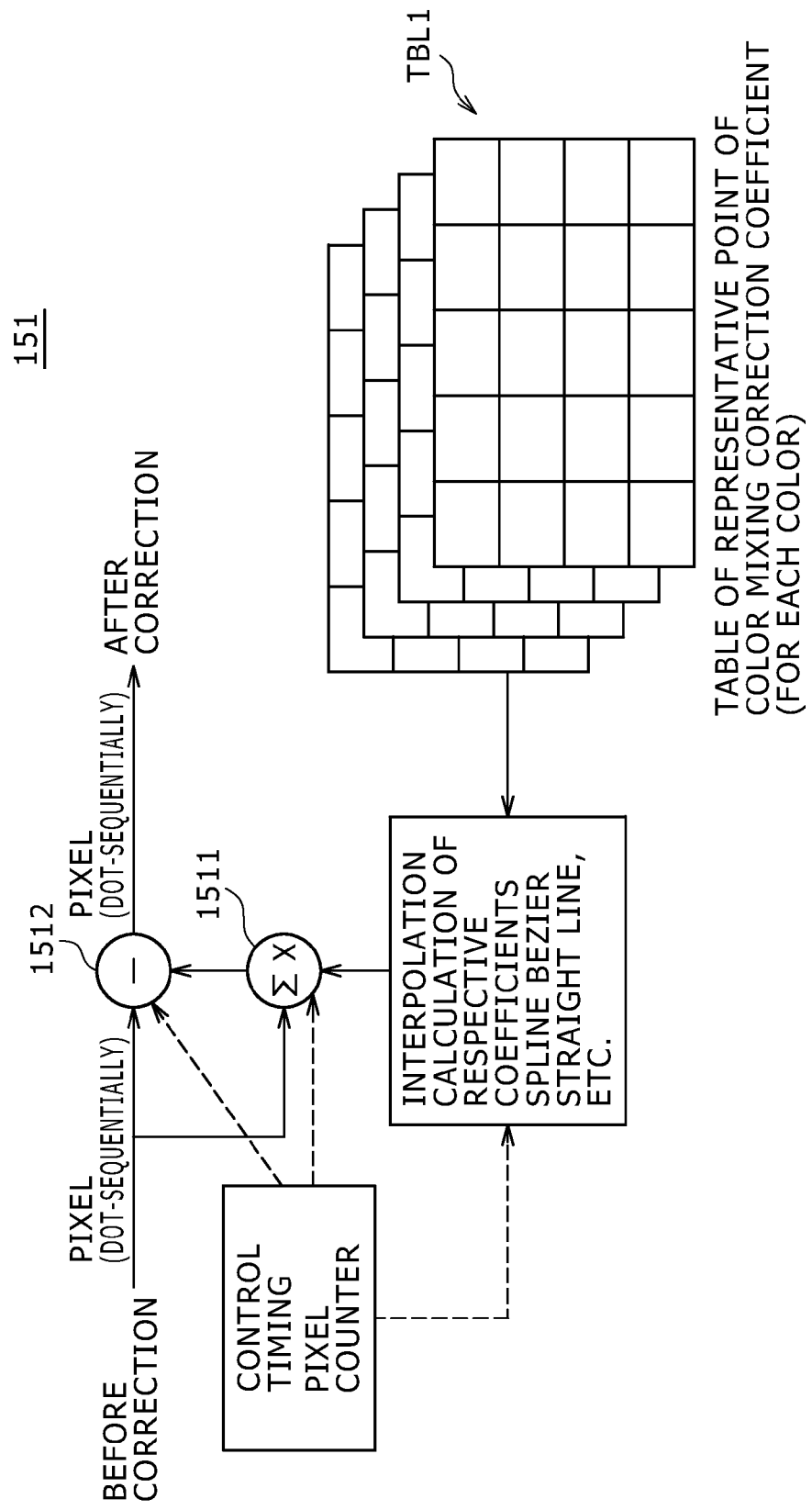
FIG. 15 is a diagram schematically showing an example (principle) of color mixing correction in a color mixing corrector relating to the present embodiment.

FIG. 15 is a diagram schematically showing an example (principle) of the color mixing correction in the color mixing corrector 151 relating to the present embodiment.

In the example of FIG. 15, a table TBL1 of the representative point of the color mixing correction coefficient is stored in the storage unit 153 for each color.

The color mixing corrector 151 reads out the necessary color mixing rates θ from the storage unit 153 in the color mixing correction, and decides the color mixing rates of the respective pixels among representative points at a predetermined timing by a method such as spline, Bezier, or linear interpolation.

Furthermore, the color mixing corrector 151 performs a multiply-accumulate operation by a multiply-accumulate operator 1511 about image signals before correction from the clamp unit 14 and the decided color mixing rates, and executes subtraction processing of the multiply-accumulate operation result and the image signal before correction by a subtractor 1512, to thereby carry out the color mixing correction.

Figure 16:
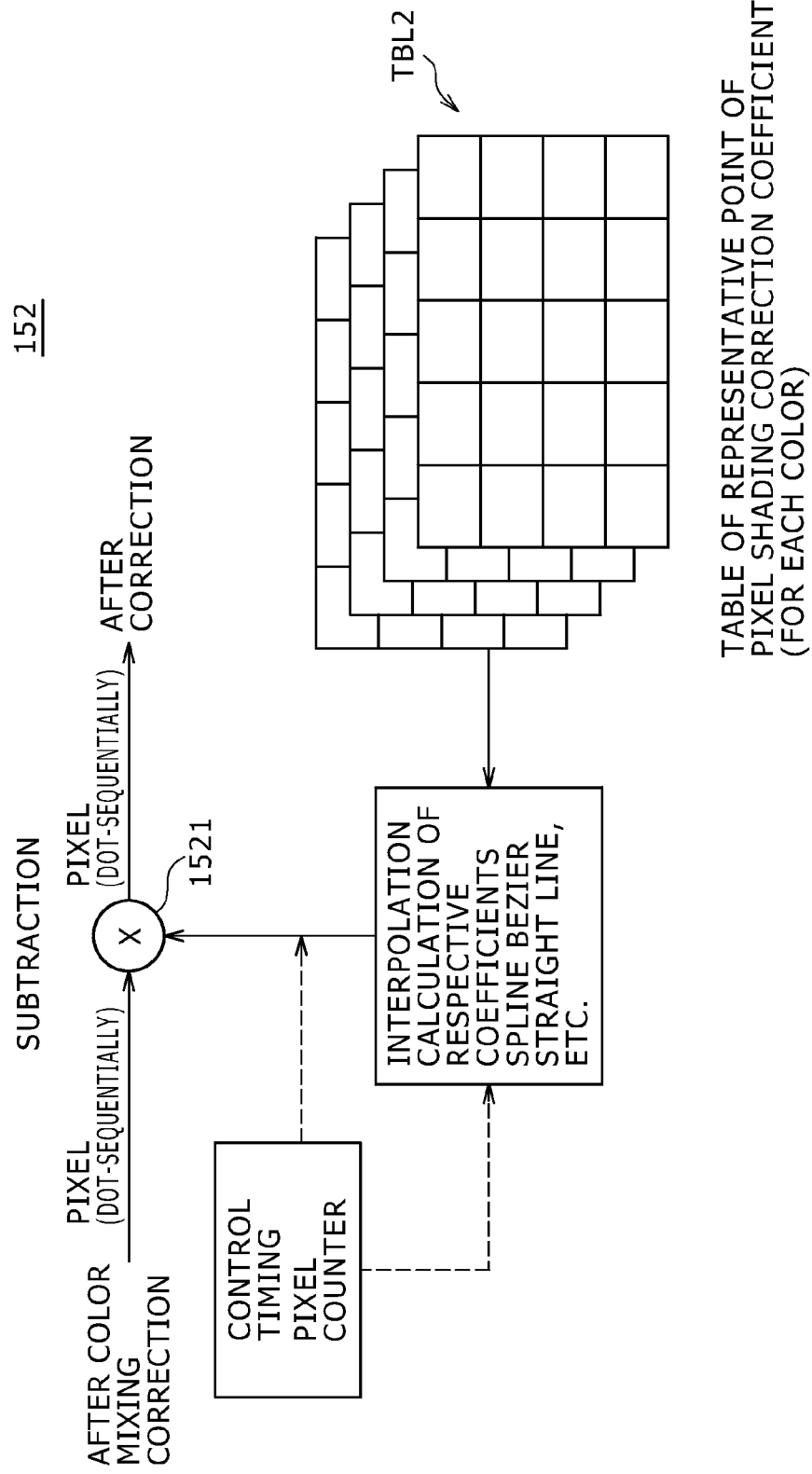
FIG. 16 is a diagram schematically showing an example (principle) of shading correction in a shading corrector relating to the present embodiment.

FIG. 16 is a diagram schematically showing an example (principle) of shading correction in the shading corrector 152 relating to the present embodiment.

In the example of FIG. 16, a table TBL2 of the representative point of the shading correction coefficient is stored in the storage unit 154 for each color.

The shading corrector 152 reads out the necessary shading correction coefficients from the storage unit 154 in the shading correction, and decides the correction coefficients of the respective pixels among representative points at a predetermined timing by a method such as spline, Bezier, or linear interpolation.

Furthermore, the shading corrector 152 executes accumulation processing by a multiplier 1521 for the image signal before the shading correction, for which the color mixing correction has been carried out in the color mixing corrector 151, and the decided correction coefficient, to thereby carry out the shading correction.

Figure 17:
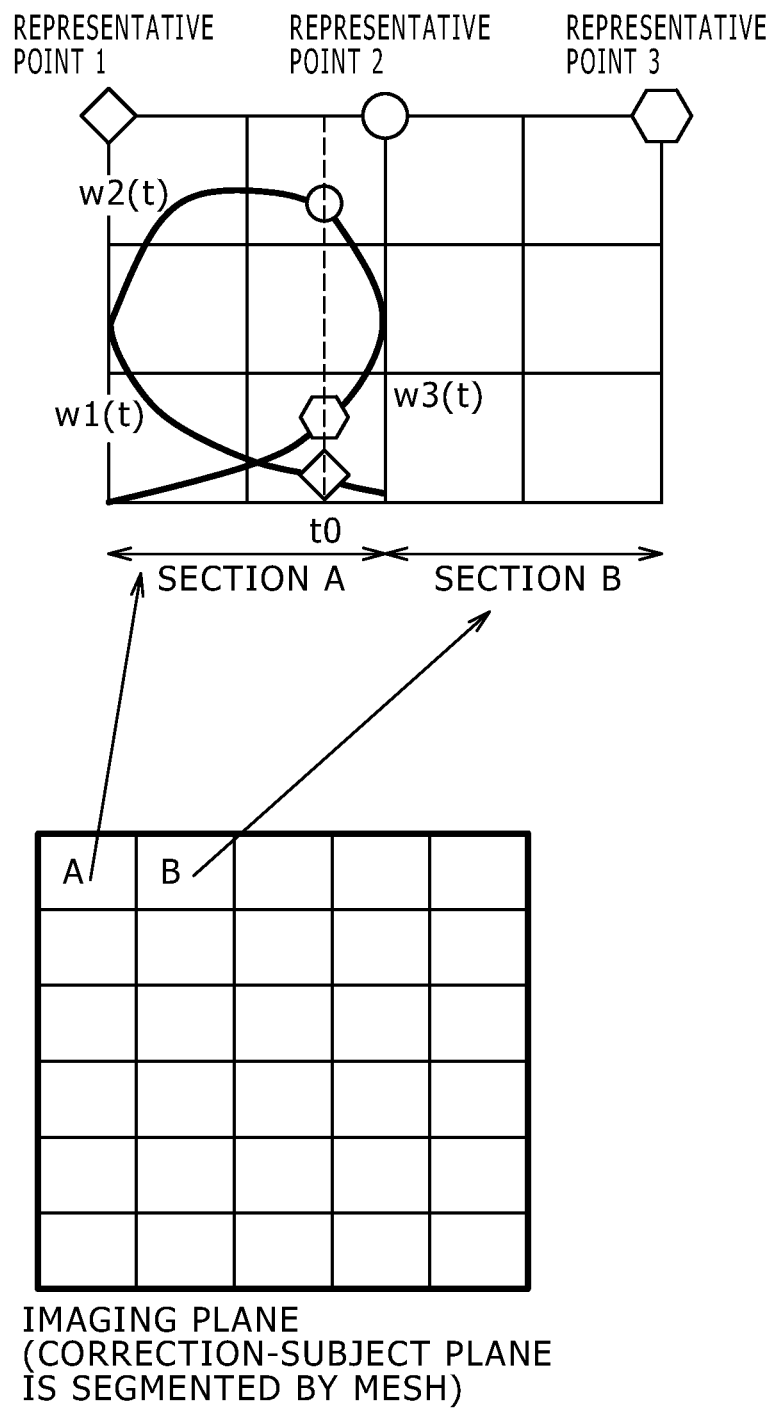
FIG. 17 is a diagram showing an example of interpolation calculation of color mixing correction and pixel shading correction relating to the present embodiment.

FIG. 17 is a diagram showing an example of interpolation calculation of the color mixing correction and the pixel shading correction relating to the present embodiment.

In the interpolation calculation, the segment between representative points (in units of meshes) is divided into N sub-segments (N is a power of 2). Furthermore, as shown in FIG. 17, the respective weighting factors for three representative points are defined in each mesh, and the required value is obtained by [respective representative points×weighting factors at interpolation position].

Here, t takes a value of 0 to 1.0 and it is assumed that 1/N step=1 pixel step.

Furthermore, the calculation is performed by so-called B-spline interpolation as follows.

[Expression 11]

$$\text{value of interpolation position } t0 = w1(t0) \cdot \text{value of representative point 1} \quad (\theta 1)$$

$$+ w2(t0) \cdot \text{value of representative point 2} \quad (\theta 2)$$

$$+ w3(t0) \cdot \text{value of representative point 3} \quad (\theta 3)$$

As described above, the image signal correcting device 15 of the present embodiment has the following characteristic configuration.

The image signal correcting device 15 uses the effective color mixing rate θ estimated for each of areas segmented in a matrix manner (mesh manner) in matching with the imaging plane of the imaging element 12, and carries out color mixing correction in which this color mixing rate is associated with θ obtained by approximating θ at the necessary pixel position (coordinates) by interpolation.

The image signal correcting device 15 carries out the shading correction for the image signal for which the color mixing correction has been carried out.

In the color mixing correction and the shading correction, the image signal correcting device 15 makes segmentation in a matrix manner (mesh manner) in matching with the imaging plane (correction-subject plane) of the imaging element 12 for example, and performs so-called B-spline interpolation by using the respective weighting factors for plural representative points in units of meshes.

Therefore, by the present embodiment, the following effects can be achieved.

Specifically, color mixing correction appropriate for in-plane distribution can be realized.

Furthermore, in the present embodiment, correction in which not only the light dissipation process but also displacement in the absorption process is taken into consideration is carried out, and thus it is possible to estimate the correct amount of signal.

As a result, correction with high accuracy can be realized.

It is also possible that the method described in detail above is formed as a program corresponding to the above-described procedure and is so configured as to be executed by a computer such as a CPU.

Furthermore, such a program can be so configured that the above-described program is executed through access by a recording medium such as a semiconductor memory, a magnetic disc, an optical disc, or a floppy (registered trademark) disc, or a computer in which this recording medium is set.

EXPLANATION OF REFERENCE NUMERALS

10 . . . Imaging device, 11 . . . Lens system, 12 . . . Imaging element, 13 . . . A/D converter, 14 . . . Clamp unit, 15 . . . Image signal correcting device, 151 . . . Color mixing corrector, 152 . . . Pixel shading corrector, 153, 154 . . . Storage unit, 16 . . . Demosaic unit, 17 . . . Linear matrix unit, 18 . . . Gamma corrector, 19 . . . Luminance/chroma signal generator

The invention claimed is:

1. An image signal correcting device comprising:
    at least a color mixing corrector configured to receive an image signal arising from photoelectric conversion of a color imaging element, and correct a color mixing component included in the image signal;
    a shading corrector configured to receive the image signal corrected by the color mixing corrector, and carry out pixel shading correction for the corrected image signal; and
    wherein the color mixing corrector configured to divide the image signal into a plurality of image groups, respectively decide a color mixing rate of each of the image groups by interpolation processing, and correct the color mixing component by the acquired color mixing rate.

2. The image signal correcting device according to claim 1, wherein the color mixing corrector sets a plurality of representative points and carries out the interpolation processing among representative points to decide a color mixing rate of each pixel.

3. The image signal correcting device according to claim 1, further comprising a storage unit that stores a color mixing correction coefficient set in advance for each of a plurality of the image groups segmented in matching with an imaging plane of the color imaging element.

4. The image signal correcting device according to claim 3, wherein the color mixing correction coefficient stored in the storage unit is measured and stored in advance as the color mixing rate of another color pixel from one color pixel.

5. The image signal correcting device according to claim 1, wherein the color mixing corrector carries out color mixing correction by performing a multiply-accumulate operation of acquired color mixing rates and input image signals and executing subtraction processing of an input image signal and a result of the multiply-accumulate operation.

6. An imaging device comprising:
    a color imaging element configured to capture a subject image; and
    an image signal correcting element configured to receive an image signal arising from photoelectric conversion by the color imaging element and carries out correction, wherein
    the image signal correcting element includes:
    a color mixing corrector configured to correct a color mixing component included in an image signal arising from photoelectric conversion by the color imaging element;
    a shading corrector configured to receive the image signal corrected by the color mixing corrector, and carries out pixel shading correction for the corrected image signal; and
    wherein the color mixing corrector configured to divide the image signal into a plurality of image groups, respectively decide a color mixing rate of each of the image groups by interpolation processing, and correct the color mixing component by the acquired color mixing rate.

7. The imaging device according to claim 6, wherein the color mixing corrector sets a plurality of representative points and carries out the interpolation processing among representative points to decide a color mixing rate of each pixel.

8. The imaging device according to claim 6, further comprising a storage unit that stores a color mixing correction coefficient set in advance for each of a plurality of the image groups segmented in matching with an imaging plane of the color imaging element.

9. The imaging device according to claim 8, wherein the color mixing correction coefficient stored in the storage unit is measured and stored in advance as the color mixing rate of another color pixel from one color pixel.

10. The imaging device according to claim 6, wherein the color mixing corrector carries out color mixing correction by performing a multiply-accumulate operation of acquired color mixing rates and input image signals and executing subtraction processing of an input image signal and a result of the multiply-accumulate operation.

11. An imaging system comprising:
    a color imaging element configured to capture a subject image; and
    an image signal correcting element configured to receive an image signal arising from photoelectric conversion by the color imaging element and carries out correction, wherein
    the image signal correcting element includes:
    a color mixing corrector configured to correct a color mixing component included in an image signal arising from photoelectric conversion by the color imaging element;
    a shading corrector configured to receive the image signal corrected by the color mixing corrector, and carries out pixel shading correction for the corrected image signal; and
    wherein the color mixing corrector configured to divide the image signal into a plurality of image groups, respectively decide a color mixing rate of each of the image groups by interpolation processing, and correct the color mixing component by the acquired color mixing rate.

12. The imaging system according to claim 11, wherein the color mixing corrector sets a plurality of representative points and carries out the interpolation processing among representative points to decide a color mixing rate of each pixel.

13. The imaging system according to claim 11, further comprising a storage unit that stores a color mixing correction coefficient set in advance for each of a plurality of the image groups segmented in matching with an imaging plane of the color imaging element.

14. The imaging system according to claim 13, wherein the color mixing correction coefficient stored in the storage unit is measured and stored in advance as the color mixing rate of another color pixel from one color pixel.

15. The imaging system according to claim 11, wherein the color mixing corrector carries out color mixing correction by performing a multiply-accumulate operation of acquired color mixing rates and input image signals and executing subtraction processing of an input image signal and a result of the multiply-accumulate operation.

* * * * *